(12) United States Patent
Lewis (10) Patent No.: US 12,108,753 B2
(45) Date of Patent: Oct. 8, 2024

(54) HUMANE ANIMAL VENUS FLY TRAP

(71) Applicant: Lisa Sherine Lewis, Ashburn, VA (US)

(72) Inventor: Lisa Sherine Lewis, Ashburn, VA (US)

( * ) Notice: Subject to any disclaimer, the term of this patent is extended or adjusted under 35 U.S.C. 154(b) by 0 days.

(21) Appl. No.: 18/073,502

(22) Filed: Dec. 1, 2022

(65) Prior Publication Data
US 2023/0172185 A1 Jun. 8, 2023

Related U.S. Application Data

(60) Provisional application No. 63/361,156, filed on Dec. 2, 2021.

(51) Int. Cl.
*A01M 23/32* (2006.01)
*A01M 23/02* (2006.01)
*A01M 23/38* (2006.01)

(52) U.S. Cl.
CPC ............ *A01M 23/32* (2013.01); *A01M 23/02* (2013.01); *A01M 23/38* (2013.01)

(58) Field of Classification Search
CPC .............................. A01M 23/26; A01M 23/32
See application file for complete search history.

(56) References Cited

U.S. PATENT DOCUMENTS

| | | | | |
|---|---|---|---|---|
| 102,761 A * | 5/1870 | Brooks | ................. | A01M 23/32 43/63 |
| 433,241 A * | 7/1890 | Hawkins, Jr. | ......... | A01M 23/32 43/63 |
| 507,086 A * | 10/1893 | Buntain | ................. | A01M 23/32 43/63 |
| 560,846 A * | 5/1896 | Donato | ................. | A01M 23/32 43/63 |
| 966,213 A * | 8/1910 | Jauregin | ............... | A01M 23/32 258/20 |
| 1,054,050 A | 2/1913 | Stanberry | | |
| 1,111,521 A * | 9/1914 | Berg | ..................... | A01M 23/32 43/63 |
| 1,168,316 A * | 1/1916 | Korcok | ................. | A01M 23/32 43/63 |
| 1,551,542 A * | 9/1925 | Crago | ................... | A01M 23/24 43/63 |

(Continued)

FOREIGN PATENT DOCUMENTS

GB 2423004 A 8/2006

*Primary Examiner* — Jessica B Wong (57) ABSTRACT

An improved animal trap comprising stationary 1 and moving frames 3 attached to support blocks 2, with torsion springs 4 that in the open position enable the trap to maintain a low profile mostly parallel to the ground, thereby eliminating the requirement of existing, commercially available traps that the animal walk beneath or through an unfamiliar object to be trapped. In the electronically triggered closed position, the frames form a complete enclosure around the animal, preventing its escape without injuring or immobilizing the animal. Magnetic or other attachments 8 to the perimeter of the moving frame hold the trap together in the closed position. The sides of the trap consist of soft textile material 5 instead of metal, reducing the risk of injury to the trapped animal. A transfer tunnel 23, attached from an opening in the side of the trap to a transfer cage 26, enables a quick and safe method of removing the animal for transport.

6 Claims, 5 Drawing Sheets

(56) References Cited

U.S. PATENT DOCUMENTS

| | | | | |
|---|---|---|---|---|
| 1,553,536 A * | 9/1925 | Irvine | ............... | A01M 23/24 43/88 |
| 1,576,707 A * | 3/1926 | Bailey | ............... | A01M 23/32 43/63 |
| 1,612,608 A * | 12/1926 | Chamberlin | ............... | A01M 23/32 43/88 |
| 1,850,182 A * | 3/1932 | Schulke | ............... | A01M 23/32 43/63 |
| 2,275,043 A | 3/1942 | Colwell | | |
| 2,603,031 A * | 7/1952 | Haseman | ............... | A01K 69/06 43/105 |
| 2,707,844 A * | 5/1955 | Ciolli | ............... | A01M 23/22 43/62 |
| 3,823,504 A | 7/1974 | Dosch | | |
| 3,834,063 A | 9/1974 | Souza | | |
| 3,903,637 A * | 9/1975 | Dorsey | ............... | A01K 69/10 43/105 |
| 4,141,172 A * | 2/1979 | Prosol | ............... | A01K 69/06 43/105 |
| 4,434,574 A * | 3/1984 | Benito | ............... | A01M 23/02 43/63 |
| 4,565,027 A * | 1/1986 | Sato | ............... | A01K 69/08 43/105 |
| 4,774,785 A * | 10/1988 | Fuhrman | ............... | A01M 23/32 43/63 |
| 4,791,753 A * | 12/1988 | Fuhrman | ............... | A01M 23/32 43/88 |
| 5,778,594 A | 7/1998 | Askins | | |
| 6,732,471 B2 | 5/2004 | Draper | | |
| 8,661,726 B2 | 3/2014 | Alfarhan | | |
| 9,439,412 B2 | 9/2016 | Kittelson | | |
| 10,172,343 B2 | 1/2019 | Radesky | | |
| 10,455,827 B2 | 10/2019 | Rich | | |
| 2009/0094882 A1 | 4/2009 | Comstock | | |
| 2017/0112119 A1 | 4/2017 | Novatney | | |
| 2018/0325094 A1 | 11/2018 | Dolshun | | |
| 2018/0360021 A1 | 12/2018 | Ziegmann | | |
| 2019/0166823 A1 | 6/2019 | Dick | | |

* cited by examiner

HUMANE ANIMAL VENUS FLY TRAP

CROSS REFERENCE TO RELATED APPLICATIONS

This application claims the benefit of provisional patent application Ser. No. 63/361,156, filed 2021 Dec. 2 by the present inventors.

BACKGROUND—PRIOR ART

The following is a tabulation of some prior art that presently appears relevant:

U.S. Patents

| Pat. No. | Kind Code | Issue Date | Patentee |
| --- | --- | --- | --- |
| 6,732,471 | B2 | 2004 May 11 | Draper |
| 9,439,412 | B2 | 2016 Sep. 13 | Kittelson |
| 3,823,504 | A | 1974 Jul. 16 | Dosch |
| 1,054,050 | A | 1913 Feb. 25 | Stanberry |
| 2,275,043 | A | 1942 Mar. 3 | Colwell |
| 5,778,594 | A | 1998 Jul. 14 | Askins |
| 3,834,063 | A | 1974 Sep. 10 | Souza |
| 10,455,827 | B2 | 2019 Oct. 29 | Rich |
| 10,172,343 | B2 | 2019 Jan. 8 | Radesky |
| 8,661,726 | B2 | 2014 Mar. 4 | Alfarhan |
| 1,576,707 | A | 1925 Dec. 17 | Bailey |

U.S. patent application Publications

| Publication Nr. | Kind Code | Publ. Date | Applicant |
| --- | --- | --- | --- |
| 20170112119 | A1 | 2017 Apr. 27 | Novatney |
| 20190166823 | A1 | 2019 Jun. 6 | Dick |
| 20180325094 | A1 | 2018 Nov. 15 | Dolshun |
| 20180360021 | A1 | 2018 Dec. 20 | Ziegmann |
| 20090094882 | A1 | 2009 Apr. 16 | Comstock |

Foreign Patents Documents

| Pat. No. | Cntry Code | Kind Code | Pub. Dt. | App or Patentee |
| --- | --- | --- | --- | --- |
| 2423004A | GB | A | 2006 Aug. 16 | Driver |

Scientists estimate that 70 million feral cats currently roam free in the United States. Feral cats are members of the species *Felis catus*, which are not naturally part of the North American ecosystem. Cats compete with other small animals for territory and food. They kill and eat millions of birds each year. With no ability to hibernate, nor means of burrowing into the ground, they confront harsh winter weather with inadequate biological protection. They often migrate to urban centers in search of food and shelter. There they meet up with another pervasive enemy—the automobile. They suffer frequent injury and illness and, too often, painful death.

Trap-Neuter-Release (TNR) programs have emerged throughout the United States in response to this problem. TNR is conceived as a humane way to reduce the feral cat population. The cats are trapped, spayed/neutered, administered a rabies shot, and returned to their colonies. Kittens under the age of 14 weeks can be socialized by humans and placed for adoption.

Unfortunately, many feral cats and kittens refuse to enter either the commercially available or homemade cat traps. Others enter only when they are starving. As a result, despite the painstaking efforts of humane societies and community cat coalitions, feral cats continue to reproduce at an alarming rate. An alternative trap option is needed.

For survival purposes, the feral mother cat instinctively teaches her young to avoid entering unfamiliar objects and spaces. The two primary trap devices currently used for trapping feral cats both require the cat to enter an unfamiliar and presumably intimidating object.

The most common trap used for TNR is a box trap U.S. Pat. No. 1,054,050 (1913). It looks like a long rectangular cage. Bait is placed in the rear of the trap. The cat enters through the front opening. On the way to the bait, it steps on a trip plate, which triggers the front door to close behind it. The box trap features two types of doors. Gravity doors fall due to gravitational force. Spring-loaded doors close with the aid of a spring.

A variety of patents have been issued or applied for, including U.S. Pat. No. 9,439,412 (2016) and US 20180325094 (2018), that attempt to improve in some way upon the box trap, including changes to the trigger mechanism and the doors.

The drop trap appears as a large rectangular cage with no base. It is commonly made of metal but can also consist of a lightweight frame covered with netting. It is propped up in front with a metal arm or a stick. Food is placed in the back. The cat must walk under the large frame to the rear of the trap to access the bait. When the cat starts eating, the trapper pulls the string, allowing the trap to drop and capturing the cat inside. The captured cat must then walk through a sliding door into a transfer cage for transport.

Many feral cats are reluctant to enter either the box trap or the drop trap. Trappers sometimes spend days and even weeks repeatedly setting and monitoring these traps, waiting for a single cat to let down its guard or become sufficiently hungry to go for the bait.

Feral cats that are successfully trapped, neutered, and released back into their colonies often become sick or injured later in life and require veterinarian medicine. Having already once been trapped in a box or drop trap, many cats remember the experience and will not enter those traps again. As a result, they suffer and die needlessly while humane societies and community cat coalitions make repeated attempts, in vain, to trap and care for them.

When both the box trap and the drop trap fail, some trappers turn to nets. Humans may attempt to lure cats into a space over which a net has been placed, then release the net. One animal net trap design U.S. Pat. No. 6,732,471 (2004) consists of a net attached to a semi-circular frame that in the open position stands perpendicular to the ground. The net is triggered mechanically upon the cat's entry and drops over the cat to enclose it. The cat must be willing to approach and walk beneath the frame of this trap to trigger it. Once inside, there is no provision for the cat's safe removal.

Another variation of an animal net trap design is U.S. Pat. No. 8,661,726 (2014). This trap has a circular base and plurality of ribs extending upward and inward to form the frame. A hollow central column with a drop weight extends upward from the center of the base. When triggered the drop weight pulls the net upward from the base to enclose the frame. Like the box and drop traps, this trap design requires the cat to approach a large unfamiliar structure that is perpendicular to the ground and cannot be even partially camouflaged. Once inside, there is no provision for the cat's safe removal.

A third type of trap that utilizes a net is the homemade "clam trap." The clam trap is commonly composed of a metal frame and a large, heavy net. When set for trapping, it is leaned against an object, such as a tree, and looks like a traditional rectangular soccer goal resting on its side. The cat is lured into the center of the "goal" by bait, at which point the trapper pulls a string that causes the top half of the frame to collapse onto the bottom half, with the cat inside.

To enter the clam trap, the cat must walk across heavy netting and up to the large metal frame. If the cat is willing to do this and is successfully trapped in the net, it may panic immediately and attempt to free itself. In the process, the cat can get tangled in the net, risking injury to itself as well as to the trapper who must eventually remove it for transport.

SUMMARY

The Human Animal "Venus Fly" Trap comprises stationary and moving frames attached to support blocks, with torsion springs that in the open position enable the trap to maintain a low profile mostly parallel to the ground, and in the electronically triggered closed position form a complete enclosure around the animal, preventing its escape without injuring or immobilizing the animal. A transfer tunnel, attached from an opening in the side of the trap to a transfer cage, enables a quick and safe method of removing the animal for transport.

Advantages

The Humane Animal "Venus Fly" Trap creates a new trap option. Our trap is able to capture a variety of small and medium-size animals. However, it was designed with feral cats and kittens in mind.

The Humane Animal "Venus Fly" Trap is designed to enable all sides of the trap to rest in an open position that is nearly parallel to the ground. The cat is not required to walk through a cage or beneath an unfamiliar metal structure to enter the trap and access the bait in the center of the trap. He/she merely has to step across a frame that is no greater than several inches in diameter and can be partially hidden under leaves or other natural materials. In one embodiment, the trap is triggered remotely by a human once the cat is completely inside, at which point the sides of the trap spring forward and envelope the cat, much like a Venus Fly Trap envelopes an insect.

The Humane Animal "Venus Fly" Trap also offers an advantage over trapping cats in a net. Our trap allows the trapped cat to remain upright with all four feet on the ground and provides ample space for the cat to move about inside the trap, without any part of the trap restraining his or her body. These features help reduce the type of extreme panic behavior that can lead to injury of the animal or the trapper.

The embodiment of the Humane Animal "Venus Fly" Trap that is triggered remotely by humans improves upon the conventional box trap in another important respect: The box trap allow humans little control over what is trapped and may inadvertently trap another wild animal, such as a raccoon or skunk. Removing the unwanted animal from this trap can be difficult or even dangerous. Our trap gives the trapper control over what is and is not trapped.

The Humane Animal "Venus Fly" Trap offers an additional significant advantage over the commercially available box and drop traps in that the sides are composed of rip-stop or a similarly lightweight fabric, and the perimeter of the moving frame can be encased in foam. A cat that is trapped may throw its body violently against the sides of the trap in an attempt to escape. When this effort fails, the cat may begin to aggressively rub its face against the sides of the trap. If the sides of the trap are metal, as in the box and drop traps, the cat can bruise its body or bloody its nose trying to push its way through. This is not possible with the Humane Animal "Venus Fly" Trap. The soft fabric poses little threat to the cat as it searches for a way out. Foam piping around the frame can further protect the cat from injury, both when the trap is closing as well as once the cat is trapped inside.

The transfer tunnel, which is also composed of soft fabric, enables a quick and safe method of removing the animal from the trap, offering a significant advantage over trapping cats in nets. The animal can remain upright as it is lured through the tunnel into the transfer cage tunnel. No human contact is required to complete this transfer, ensuring maximum safety for both the animal and the trapper.

DRAWINGS—REFERENCE NUMERALS

Ref 1 stationary PVC pipe frame component;
Ref 2 support block;
Ref 3 moving PVC pipe frame component;
Ref 4 torsion spring;
Ref. 5 rip-stop fabric
Ref 6 removable net floor
Ref 7 control wires
Ref 8 magnets
Ref 9 foam pipe padding
Ref 10 remote-control transmitter
Ref 11 control electronics
Ref 12 release mechanism
Ref 13 battery
Ref 14 stationary hooks
Ref 15 pressure-sensitive electrical switch
Ref 16 remote-control receiver
Ref 17 master timer integrated circuit
Ref. 18 first slave timer integrated circuit
Ref. 19 second slave timer integrated circuit
Ref. 20 servo motor
Ref 21 rotating hook
Ref. 22 opening in rip-stop fabric
Ref 23 transfer tunnel
Ref 24 snaps Ref 25 elastic band
Ref 26 transfer cage

DETAILED DESCRIPTION—FIGS. 1, 2, 3, 4, 5, 6, 7, 8, AND 9—FIRST EMBODIMENT

Figure 1:
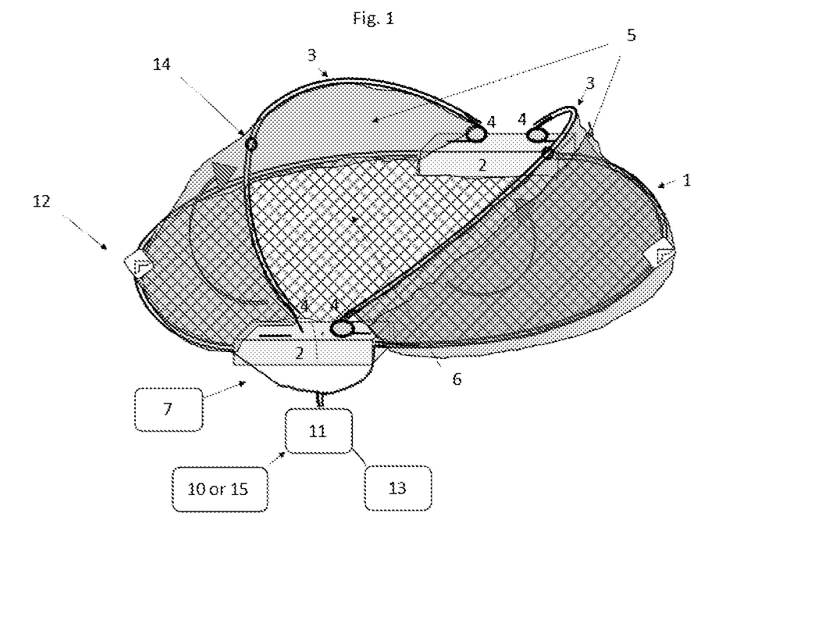
FIG. 1 illustrates one embodiment of the trap.

Referring now to the figures, illustrated in FIG. 1 is the first embodiment of the animal trap. It is constructed of PVC pipe 1, 3, torsion springs 4, and support blocks 2, to form a framework with stationary and moving parts. The two stationary sides of the pipe 1 form the stationary frame, which rests on the ground, rigidly attached to two support blocks 2 that hold it in place at the ends of each semi-circle, forming an approximate circle. This circle forms the floor of the trap and frames the netting 6. The upper, moving pipes 3 form the moving frame and are covered with rip-stop or similarly lightweight, tear-resistant textile material 5 that attaches to the stationary pipes 1 of the stationary frame. In the set/open position, the moving pipes 3 of the moving frame are held open, against the force of the springs 4, by stationary hooks 14 connected to rotating hooks on electro-mechanical release boxes 12. When the moving pipes 3 are vertically oriented, the spring 4 tension at the joints is at a minimum, just enough to hold the two sections firmly together. This is the closed position. Note that FIG. 1 depicts the trap in a partially open position for clarity. When the trap is in the set/open position, the moving pipes 3 are mostly parallel to the ground. The stationary pipes 1, moving pipes 3, and textile fabric 5 can be partially hidden under leaves or grass, and the trap is ready to operate. Bait is set in the center of the trap. When an animal enters the trap, the release mechanisms 12 with rotating hooks disengage the stationary hooks 14 on the moving frame, and the two moving pipes 3 begin to close. The springs 4 move the trap halves to the vertical (closed) position, and the animal is contained in the fabric dome, unharmed. The fabric includes zippered openings and a transfer tunnel (not shown in FIG. 1) through which the captured animal can be guided into a transfer cage for transport.

Figure 2:
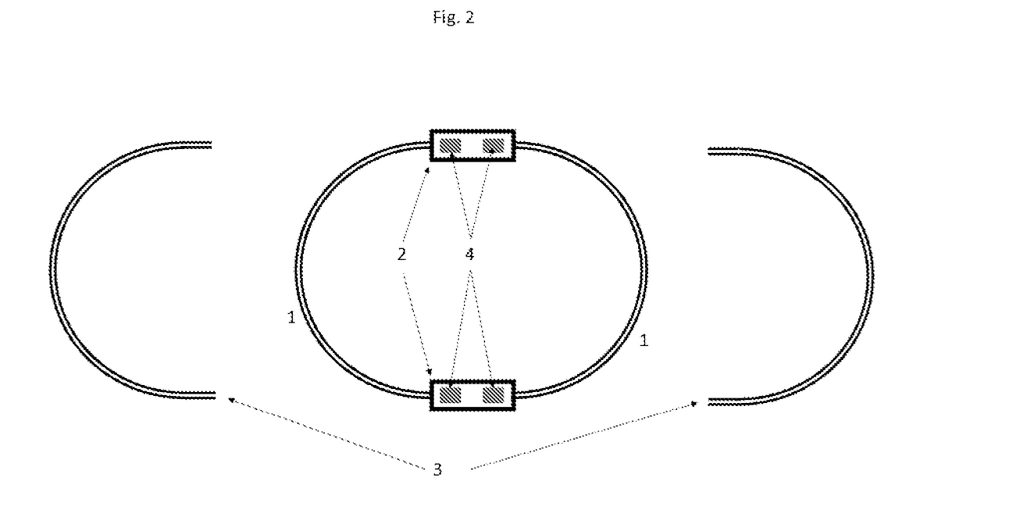
FIG. 2 illustrates the major mechanical components of the frame of the trap.

Illustrated in FIG. 2, four sections of PVC pipe 1, 3 are heat-formed into semicircular arcs with extended straight sections at the ends of the arcs for attachment to the springs 4 and support bases 2 of the frame.

Figure 3:
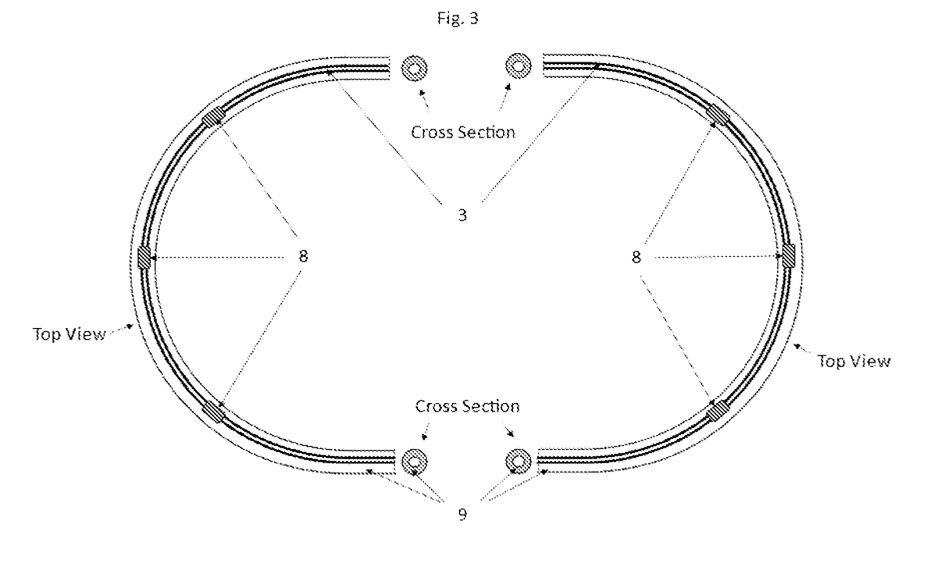
FIG. 3 illustrates a detailed view of the moving parts of the frame.

Illustrated in FIG. 3, attached to the two moving pipes 3 are matching pairs of attracting magnets 8. When the trap closes, these attachments align and hold together the moving pipes 3. Also shown in FIG. 3 is optional foam padding 9 over the PVC pipe 3 that provides extra protection when trapping delicate animals.

Figure 4:
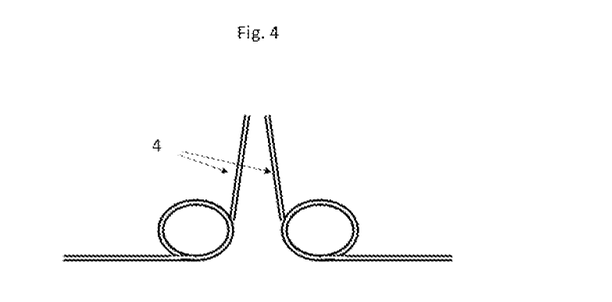
FIG. 4 illustrates the torsion springs in the relaxed position.
Figure 5:
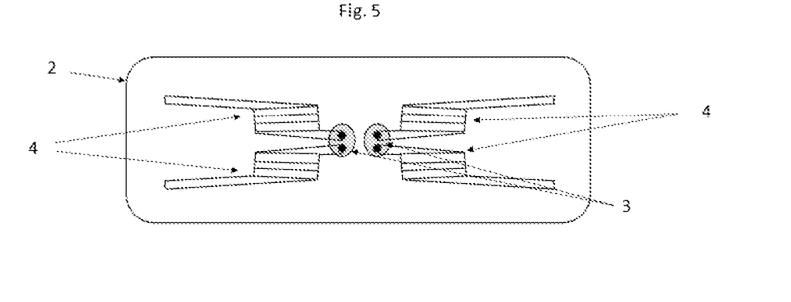
FIG. 5 illustrates the support block with the torsion springs in place and the ends of moving pipes.

Illustrated in FIG. 4 is a detailed side view of the springs 4 in their relaxed position (closed) and in FIG. 5, installed on the support block 2 showing the right-handed and left-handed pairing of the springs for strength and balanced force. The attachments of the moving pipe sides 3 are indicated.

Figure 6:
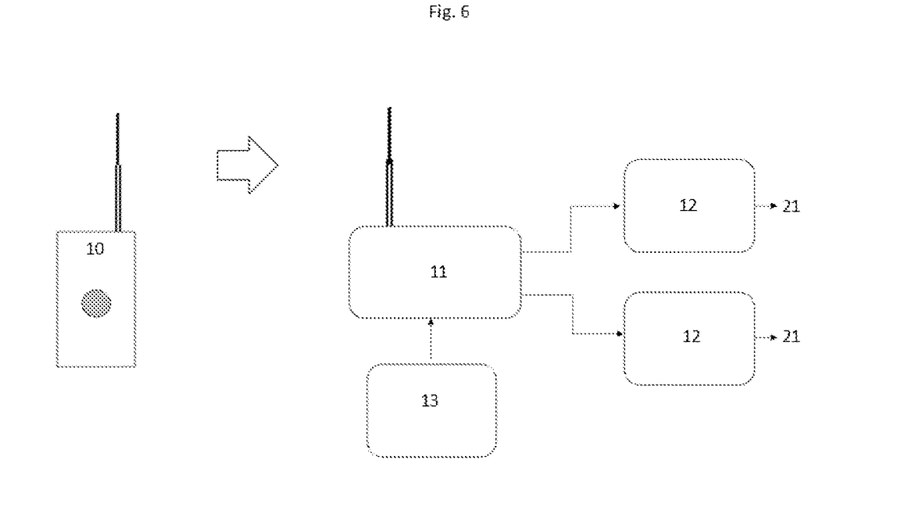
FIG. 6 illustrates an overview of the remote-control embodiment of the electronic trigger and release system.

Illustrated in FIG. 6, the prototype embodiment is activated by a human operator. It employs a commercially available, long-range, remote-control transmitter 10 that is used to switch on the custom-built control electronics 11 and release mechanisms 12 with rotating hooks 21 described later. The electronics are powered by a battery 13.

Figure 7:
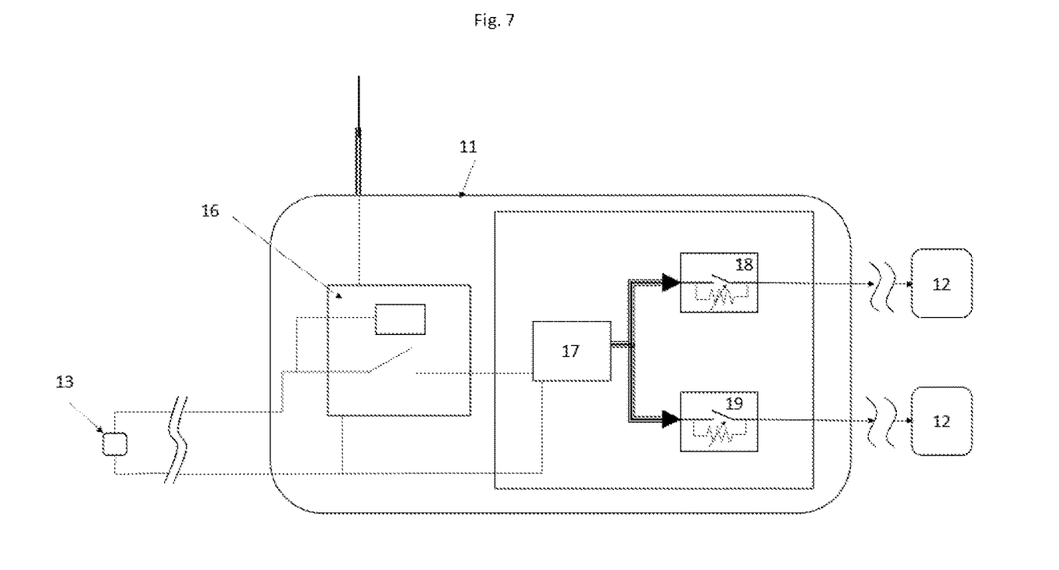
FIG. 7 illustrates an overview of the autonomous embodiment of the electronic trigger and release system.

FIG. 7 describes the control electronics box 11 with the remote-control embodiment shown. The autonomous embodiment has only the pressure switch in the circuit. Integrated circuits (ICs) 17, 18, 19 are pulse generators (timers). IC 17 is set up as a master oscillator to provide synchronized, short-trigger pulses to 18 and 19. When triggered, 18 and 19 send servo position command pulses to their respective release mechanism boxes 12. The switches shown on 18 and 19 are manual position controls used for setting the trap, i.e. open/close. IC's 18 and 19 are individually adjustable to accommodate differences in servo position response to achieve simultaneous release of the two moving frame members 3.

Figure 8:
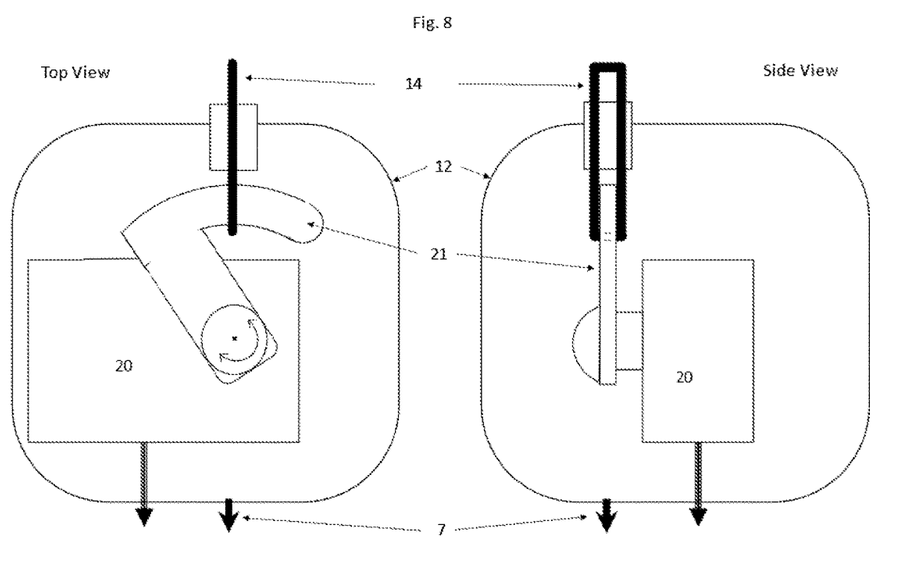
FIG. 8 illustrates a detailed view of the control electronics.

FIG. 8 details the release mechanism box 12, which uses a pulse width modulation (PWM) controlled servo motor 20 to rotate a hook 21. As shown, the mechanical load of the trap springs is held by the servo motor bearings. For larger traps with more spring load, the release mechanism could also be arranged with the pivot axis of the hook being supported by a separate axle that would bear the straight-line load while the servo motor only supplies torque to the hook, either by control rod or direct attachment.

Figure 9:
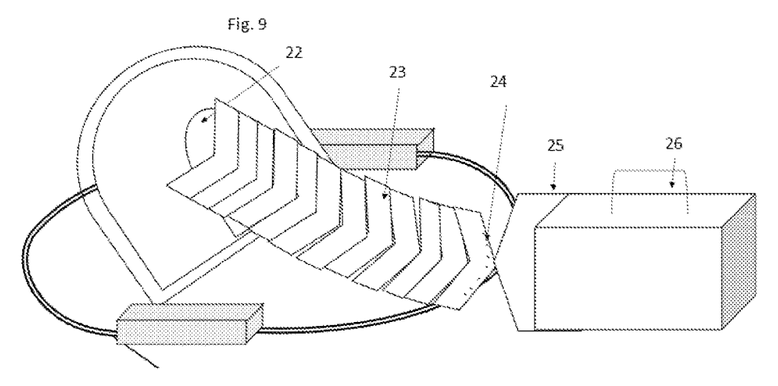
FIG. 9 illustrates a detailed view of one of the release boxes.

FIG. 9 details the transfer tunnel 23, which connects an opening 22 in the side of the trap to a transfer cage 26 outside the trap. The transfer tunnel is closed with snaps 24. It is fitted on one end with elastic 25, which forms a tight seal around the front of the transfer cage 26.

Operation

In the first embodiment of the Humane Animal "Venus Fly" Trap, the trap is transported to the location where animal-trapping is desired. A flat section of ground is selected. The trap FIG. 1 is placed on the ground. The control electronics FIG. 6 are switched on and re-set. The moving frame 3 of the trap is pressed nearly parallel to the ground, in the open position. The stationary hooks 14 of the moving frame 3 are attached to the rotating hooks 21 of the stationary frame 1. The trap is set in the open position. The textile fabric 5 is pushed to the perimeter of the stationary 1 and moving frames 3, creating maximum open space within the trap. Leaves or grass are scattered across the stationary and moving frames and piled atop the control electronics, enabling partial camouflage of the trap. Bait is placed in the center of the trap.

The trapper moves far away from the trap, out of sight of the target animal but in good position for monitoring the trap. Then the trapper waits for the target animal to arrive. When the animal enters the trap and begins eating, the trapper presses the remote-control transmitter 10, which sends servo position command pulses 18, 19 to their respective release mechanism boxes 12. This triggers the rotating hooks 21 on the stationary frame 1 to release the stationary hooks 14 on the moving frame 3. Magnets 8 on the perimeter of the moving frame 3 join up, snapping the trap closed. The animal is trapped. The trapper waits for the animal to calm down. Then the trapper attaches the transfer cage 26 to the transfer tunnel 23. The transfer tunnel 23 is formed by an opening in the side of the trap 22 that is covered with soft fabric and extends to the perimeter of the trap's base. It can be fastened to the base with snaps 24. On the other side of the snaps, the tunnel leads away from the trap and can be secured to the front of a transfer cage with an elastic band 25. From the inside of the trap, the transfer tunnel creates the appearance to the animal of a possible escape route. Once the tunnel is connected to the transfer cage, the trapper unsnaps the tunnel and lifts the fabric. The animal mistakes this temporary movement on the side of the trap for the creation of an opening through which it can escape and is quickly lured into the transfer cage. A clear sliding door on the back end of a two-door transfer cage can further enhance the appearance to the trapped animal of an escape route through the transfer tunnel. Once inside the transfer cage, the trapper closes and locks the front sliding door on the cage. The animal is ready for transport.

Figure 10:
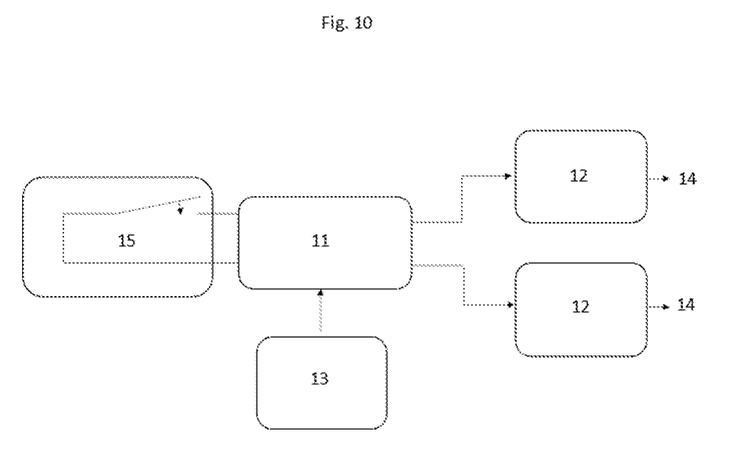
FIG. 10 illustrates a detailed view of the transfer tunnel.

FIG. 10—Alternative Embodiment

In another embodiment, FIG. 10, a pressure-sensitive electrical switch 15 can be placed inside the trap, and the trigger will be activated by the weight of the animal itself without human intervention. The control electronics are the same for both embodiments. The pressure plate switch could simply replace the remote-controlled switch in the circuit with a plug-in connection similar to an ear phone jack. Other sensor/switch technologies can also be employed as the situation warrants.

Advantages of Alternative Embodiment

A pressure-sensitive electrical switch in place of a remote-control transmitter enables an animal to be trapped without requiring the trap to be continuously monitored by a human. This can be advantageous when the daily routine of the target animal is unknown. Additionally, a pressure-sensitive electrical switch enables trappers to trap animals in pitch dark or in locations where the trapper's view of the trap is otherwise obstructed.

CONCLUSION, RAMIFICATIONS, AND SCOPE

Thus, the reader will see that at least one embodiment of the Humane Animal "Venus Fly" Trap offers a way to trap animals with numerous significant advantages over existing traps:
  It enables all sides of the trap to rest in an open position that is low-profile, being nearly parallel to the ground, so that the animal is not required to walk through a cage or beneath an unfamiliar metal structure to enter the trap and access the bait.
  It enables the trap, when in the set/open position, to be partially camouflaged in leaves, grass, or other natural materials, thus further enticing the animal to let down its guard and enter the trap.
  In can be triggered remotely by a human, giving trappers control over which animals are trapped and when.
  It allows the trapped animal to remain upright with all four feet on the ground and provides ample space for moving about inside the trap, thereby reducing the type of extreme panic behavior in the animal that can lead to injury.
  It offers further protection to the trapped animal, with sides composed of flexible lightweight fabric, rather than metal, and foam padding around the moving frame.
  It enables a quick and safe method for removing the animal from the trap, through a custom-built transfer tunnel.

This disclosure describes the concept and a design of the trap. A specific embodiment that has been built and successfully tested is described in detail as an example only. Other variations are expected. The size of the trap will be built to match the size of the animal being trapped and will vary accordingly. Therefore, no dimensions are provided. Specific choices of materials and components, (e.g. PVC pipe, fabric, torsion springs, remote-control transmitter/receiver, electronics, release hooks and servo motors) are not critical to the concept; any number of alternative materials and components, and combinations thereof, are possible.

The invention claimed is:

1. An animal trap, comprising:
   a stationary frame, with a plurality of sides, that attaches to support blocks and forms an enclosed space on the ground, all sides resting on and parallel to the ground,
   a rotating hook on each side of said stationary frame,
   a moving frame, with a plurality of sides, that mirrors said stationary frame and attaches to said support blocks,
   stationary hooks on each side of said moving frame, that attach to said rotating hooks on said stationary frame when said moving frame is set in the open position, mostly parallel to said stationary frame,
   torsion springs in the support blocks at said sides of said moving frame that form joints at each end of said moving frame sides, enabling movement of and tension in said moving frame,
   an electronic system that sends signals to said rotating hooks on all sides of said stationary frame simultaneously, enabling release of said stationary hooks and rotation of said moving frame by means of said torsion springs,
   flexible textile material that extends on all sides from said moving frame to said stationary frame, and across the base of said stationary frame,
   attachments at the perimeter of said moving frame that temporarily join all sides of said moving frame together in a closed position, when said moving frame is perpendicular to said stationary frame, forming an enclosure between said moving frame and said stationary frame,
   a transfer tunnel attached to said moving frame in said closed position that allows removal of an animal from said enclosure,
   thereby enabling all sides of said trap, when in said open position, to maintain a low profile mostly parallel to the ground, and preventing the animal from escaping, when in said closed position, without injuring or immobilizing said animal.

2. The animal trap of claim 1, wherein all sides of said stationary and moving frames are of predetermined equivalent size and strength, being constructed from any lightweight, high-strength, flexible material.

3. The animal trap of claim 1, wherein said moving frame in said closed position extends out from the perimeter of said stationary frame to the center of said trap.

4. The animal trap of claim 1, wherein said torsion springs of predetermined size and strength enable said moving frame to fold back on all sides, creating maximum tension when all sides are mostly parallel to said stationary frame, in said open position, and minimum tension when all sides are perpendicular to said stationary frame, in said closed position.

5. The animal trap of claim 1, wherein said textile material creates said enclosure, when in the trap's said closed position, of predetermined dimensions and strength for trapping animals.

6. The animal trap of claim 1, wherein said attachments to said perimeter of said moving frames are of predetermined number, composition, size, and strength for securing an animal in a trap.

* * * * *